United States Patent [19]

Kamimura et al.

[11] Patent Number: 4,947,324
[45] Date of Patent: Aug. 7, 1990

[54] STEERING CONTROL SYSTEM FOR MOVING VEHICLE

[75] Inventors: Kenji Kamimura; Sadachika Tsuzuki, both of Saitama, Japan

[73] Assignee: Honda Giken Kogyo Kabushiki Kaisha, Tokyo, Japan

[21] Appl. No.: 362,630

[22] Filed: Jun. 7, 1989

[30] Foreign Application Priority Data

Jun. 17, 1988 [JP] Japan .................. 63-149619

[51] Int. Cl.$^5$ ........................... G06F 15/50
[52] U.S. Cl. ................. 364/424.02; 318/587; 180/169
[58] Field of Search .......... 364/443, 444, 424.02, 364/449; 180/167, 168, 169; 318/587

[56] References Cited

U.S. PATENT DOCUMENTS

| | | | |
|---|---|---|---|
| 3,687,556 | 8/1972 | Price et al. .................. | 356/152 |
| 4,099,591 | 7/1978 | Carr ............................ | 180/168 |
| 4,253,541 | 3/1981 | Lida et al. .................... | 180/168 |
| 4,305,077 | 12/1981 | Tsumura ...................... | 342/451 |
| 4,309,758 | 1/1982 | Halsall et al. ............... | 364/424.02 |
| 4,626,995 | 12/1986 | Lofgren et al. ............. | 364/424.02 |
| 4,700,301 | 10/1987 | Dyke ........................... | 364/424.02 |
| 4,796,198 | 1/1989 | Boultinghouse ............. | 364/424.02 |
| 4,817,000 | 3/1989 | Eberhardt .................... | 364/424.02 |
| 4,846,297 | 7/1989 | Field et al. .................. | 364/424.02 |
| 4,852,677 | 8/1989 | Okazaki ....................... | 180/169 |

*Primary Examiner*—Gary Chin
*Attorney, Agent, or Firm*—Pollock, VandeSande and Priddy

[57] ABSTRACT

A steering control system wherein a light beam emitted from the moving vehicle and reflected by plural reflecting means disposed apart from and around the moving vehicle, is received by a beam receiver means mounted on the vehicle. A current position of the vehicle is detected based on the output of the beam receiver means. The steering angle of the vehicle is fixed at a predetermined value when the moving vehicle is at a switching point where a straight traveling course is to be changed into a turning course, and is released when it is detected that any one of azimuthes of the light-reflecting means viewed from the moving vehicle substantially coincides with a predetermined azimuthal angle, or has exceeded the predetermined azimuthal angle.

10 Claims, 7 Drawing Sheets

STEERING CONTROL SYSTEM FOR MOVING VEHICLE

BACKGROUND OF THE INVENTION

1. Field of the Invention

The present invention relates to a steering control system for a moving vehicle, and more particularly to a steering control system for the travel of a moving automobile, an unmanned mobile and carrying device in a factory, or an automated vehicle for use in agriculture, civil engineering machinery and the like along a traveling course comprising a straight traveling course and a turning course.

2. Description of the Prior Art

Heretofore, as a system for detecting a present position of a moving body such as the moving vehicles as described above, there has been proposed a system provided with a means for scanning a light beam emitted from a moving body in the circumferential direction or every azimuthal directions centering around the moving body, light-reflecting means for reflecting to return the light beam in the direction of incident light and secured at at least three positions apart from the moving body, and a beam receiver means for receiving light reflected from the light-reflecting means (Japanese Patent Laid-open No. 67476/1984).

In the above mentioned prior art, differential azimuthes between adjoining two of three light-reflecting means centering around the moving body are detected on the basis of the received beam output of the light-receiving means, and then a position of the moving body is operated based on the detected differential azimuthes and positional information of the light-reflecting means which have been previously set.

However, in the above described prior art, since a position of the moving body is detected on the basis of the output of the beam receiver means whereby a traveling direction of the moving body is controlled, when the moving body is rotated at a large angular velocity, there is a possibility of producing a significant error in the result of calculation for the position. Accordingly, there has been a problem that control for steering becomes difficult in a traveling state for such a course in which an orientation of the moving body is changed abruptly as in a turning course.

With respect to the above problem, if a turning speed of the moving body is slower significantly than a traveling speed thereof in a straight traveling course, there is not a fear of producing a remarkable error in the calculation of position. In this case, however, there arises another problem that a considerable period of time is required until turning of the moving body is completed so that working efficiency decreases.

As a countermeasure therefor, there has been proposed in Japanese Patent Laid-open No. 269610/1987 a control system constructed in such manner that a beam receiver means is composed of three independent beam receivers and in addition, a steering control means for straight traveling course and a steering control means for turning course are separately provided from one another, wherein the steering control means for the turning course is operated to perform a steering control on the basis of information for steering control which has been previously set and stored, and the reflected light beam to be detected by each of the three beam receivers is switched and changed at every time of starting as well as finishing a turn of the moving body, and then a position of the moving body in the following straight traveling course is calculated.

In the above conventional system, however, since three independent rotating beam receivers are provided, there have been such problems that the light receivers means becomes larger in size and more expensive and that the beam receivers corresponding to the respective light-reflecting means must be switched in every event of effecting turning motion of the moving body. Furthermore, there is a necessity of setting and storing steering positional information for a turning motion.

SUMMARY OF THE INVENTION

An object of the present invention is to solve the above described problems of the prior art and to provide a steering control system for a moving vehicle in which traveling thereof in a straight traveling course and a turning course can be repeatedly continued by using a single beam receiver without any switching or modification of the operation mode of the beam receiver, and the position at which the moving vehicle shifts from a turning course to a straight traveling course can be easily detected.

In order to solve the above described problems, the present invention is characterized by a steering control system wherein a light beam emitted from a moving vehicle is scanned in all the different azimuthal directions around the moving vehicle, the light reflected by a plurality of reflecting means disposed at at least three positions apart from and around the moving vehicle, respectively, is received in order by a beam receiver means mounted on the moving vehicle and rotating in a horizontal plane, a positional information of the moving vehicle is detected on the basis of the output of the beam receiver means so that the moving vehicle travels on the basis of the positional information along a straight traveling course and the succeeding turning course, and the control system comprises means for detecting differential azimuthes between two adjoining light-reflecting means centering around the moving vehicle, a means for controlling steering of the moving vehicle in a straight traveling course based on the differential azimuthes, a means for fixing the steering angle of the moving vehicle at a predetermined angle at the time when the moving vehicle positions at a switching point where a straight traveling course is to be changed into a turning course, a detection means for detecting a substantial coincidence of any one of azimuthes of the respective light-reflecting means viewed from the moving vehicle with a predetermined angle or detecting that any one of azimuthes of the respective light-reflecting means viewed from the moving vehicle has exceeded a predetermined angle, and a means for releasing the fixation of the steering angle in response to a detection signal of the detection means.

According to the present invention having the above described construction, in traveling of a straight course, a relative position of the moving vehicle to the light-reflecting means can be detected on the basis of the differential azimuthes between adjoining two light-reflecting means viewed from the moving vehicle, and a traveling direction of the moving vehicle can be controlled on the basis of the detected relative position of the moving vehicle.

On the other hand, in traveling of a turning course succeeding to a straight traveling course, since the moving vehicle is turned while fixing a steering angle, the moving vehicle can turn with a prescribed turning locus. Timing of completing the turning is obtained by detecting either a substantial coincidence of a predetermined angle with a corresponding one of azimuthes of the respective reflecting means around the moving vehicle which are calculated based on a signal resulting from reception of the light beam from the light-reflecting means, or detecting that any one of said azimuthes exceeds the predetermined corresponding angle, and hence a position of the moving vehicle in a turning course can be simply detected, while maintaining the operation of the beam receiver the same as that in a straight traveling course.

Moreover, since positional information of the moving vehicle for steering control both in a straight traveling course and a turning course is obtained from the output of one and the same beam receiver means, construction for the system can be made easily according to the present invention.

DETAILED DESCRIPTION OF THE PREFERRED EMBODIMENTS

Figure 6:
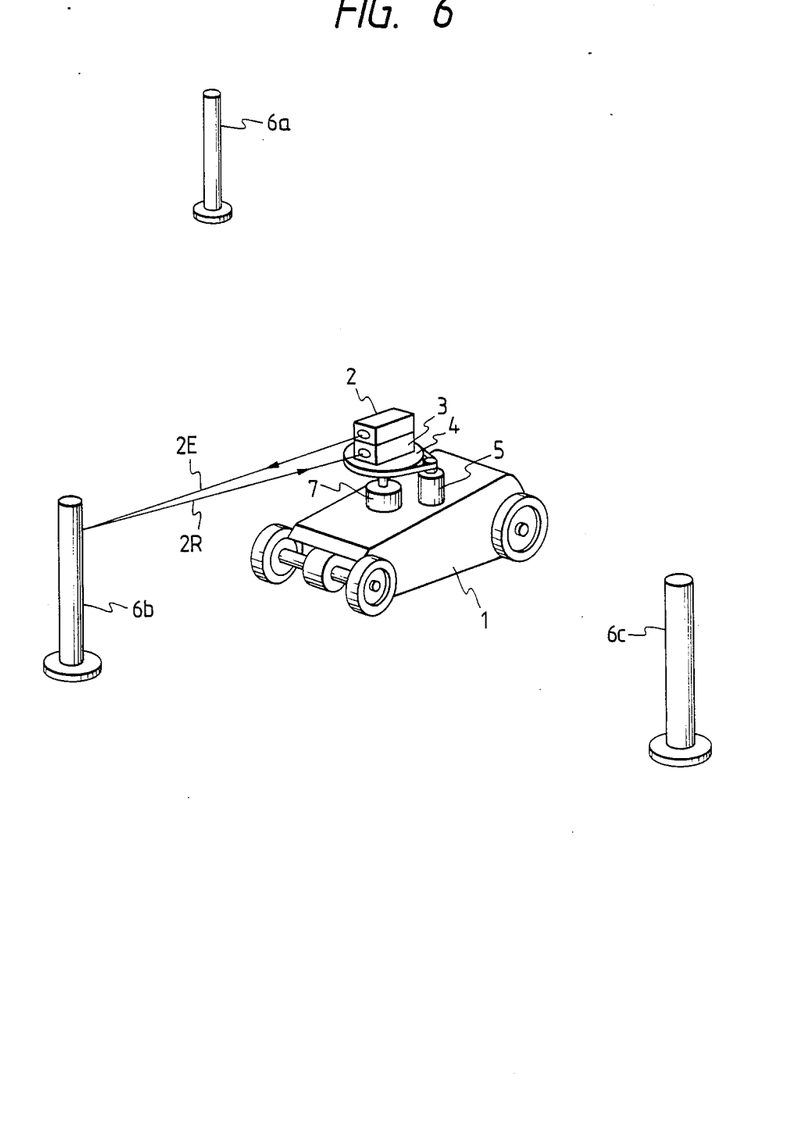
FIG. 6 is a perspective view showing a moving vehicle and reflectors.

An embodiment of the present invention will be described hereinbelow by referring to the accompanying drawings. FIG. 6 is a perspective view showing a state of arrangement in respect of a moving vehicle carrying the control system according to the present invention and a plurality of light reflectors disposed in an area in which the moving vehicle travels.

In FIG. 6, the moving vehicle 1 is one for use in agricultural working such as a lawn mower and the like. A rotating table 4 driven by a motor 5 is mounted on the upper part of the moving vehicle 1. The rotating table 4 mounts a beam source 2 for emitting light beam 2E and a beam receiver 3 for receiving light reflected by each of the reflectors 6a-6c for reflecting the light beam 2E. The beam source 2 is provided with a light beam emitting means (light-emitting diode) and the beam receiver 3 is provided with a means for receiving incident light to convert it into an electrical signal (photo-diode) (both of them are not shown). Furthermore a rotary encoder 7 is disposed so as to be interlocked with a drive shaft of the rotating table 4, so that when pulses output from the rotary encoder 7 are counted, a turning angle of the rotating table 4 can be detected.

The reflectors 6a-6c are located around a working area of the moving vehicle 1. Each of the reflectors 6a-6c has a reflection surface reflecting incident light in the incident direction and for this purpose, a so-called corner cube prism which has been conventionally available on the market and the like may be used.

Figure 1:
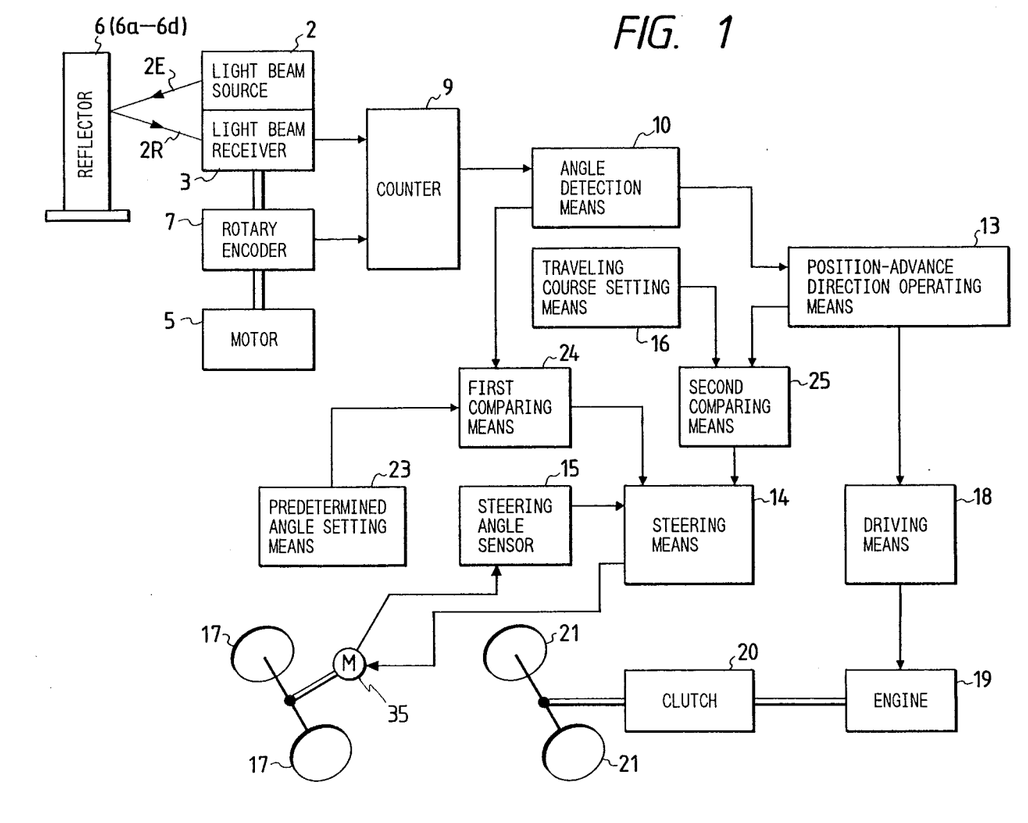
FIG. 1 is a block diagram illustrating an embodiment of the present invention.

Next, the construction of the control system in the present embodiment will be described in accordance with the block diagram of FIG. 1 wherein the light beam 2E emitted from the beam source 2 is scanned in a rotating direction of the rotating table 4 and the light beam 2E is reflected by one of the reflectors 6a-6c. The light beam 2R reflected by the one of the reflectors 6a-6c is introduced into the beam receiver 3.

The reflected light 2R is detected as a signal indicating the azimuth of the respective reflectors 6a-6c defined with respect to an advance direction of the moving vehicle.

In a counter 9, the number of pulses output from the rotary encoder 7 is counted in accordance with rotation of the rotating table 4. The value counted of the pulses is transferred to an angle detection means 10 whenever reflected light is received by the beam receiver 3. In the angle detection means 10, each angle defined between the adjoining two reflectors 6a-6c, respectively, viewed from the moving vehicle 1, i.e., the differential azimuth, is calculated on the basis of the counted value of the pulses transferred in every reception of the reflected light beam.

In a position-advance direction operating means 13, coordinates and an advance direction of the moving vehicle 1 are operated, and the results of the operation are inputted to a second comparing means 25. In the second comparing means 25, data indicating a traveling course set in a traveling course setting means 16 are compared with the coordinates and the advance direction of the moving vehicle 1 obtained in the position-advance direction operating means 13. The comparison results are supplied to steering means 14, and a steering motor (M) 35 connected to front wheels 17 of the moving vehicle is driven on the basis of the abovementioned comparative results. An angle of steering for the front wheels 17 driven by the steering motor 35 is detected by means of a steering angle sensor 15 mounted on the front wheels of the moving vehicle 1, and the value detected is fed back to the steering means 14.

An angle calculated in accordance with a predetermined calculating expression (which will be described later) is set in a predetermined angle setting means 23. The predetermined angle is compared with an azimuth of the respective reflectors 6a-6c viewed from the moving vehicle 1 which is obtained based on the differential azimuth between two adjoining reflectors detected in the angle detection means 10 in a first comparing means 24, and the results of the comparison are inputted to the steering means 14.

Three kinds of angle values for each left and right turnings of the moving vehicle 1, i.e., six kinds of angle values in total which are calculated in accordance with angle calculating expressions are set in the predetermined angle setting means 23. The number of kinds of angle values is the same as that of the reflectors placed. In the present embodiment, since the reflectors are set at three positions, the number of kinds is three. Each of these angle values is compared with the azimuth of a corresponding reflector to determine whether or not the turn control of the vehicle should be finished.

As a result of the comparison in the second comparing means 25, when it is judged that the moving vehicle 1 reaches a position where the vehicle is scheduled to shift from a straight traveling course to a turning course, the steering means 14 drives the steering motor 35 based on the preset and fixed steering angle data so that the steering angle of the vehicle is fixed to a predetermined value.

After an alteration to the driving control mode of the steering motor on the basis of the fixed steering angle data, the steering means 14 supervises a signal inputted from the first comparing means 24. In the case where it is judged that one of the azimuthes of the respective reflectors 6a-6c viewed from the moving vehicle 1 is within a range of such a predetermined angle which is comparative object of the aforesaid azimuthes among the predetermined angles which have been set in the predetermined angle setting means 23, a detection signal is output. When the detection signal is inputted to the steering means 14 from the first comparing means 24, the steering means 14 releases the driving control of the steering motor 35 based on the fixed steering angle data to return steering control in a straight traveling course.

A driving means 18 controls starting and stopping of an engine 19 as well as operation of a clutch 20 for transmitting the power of the engine 19 to rear wheels 21.

Figure 2:
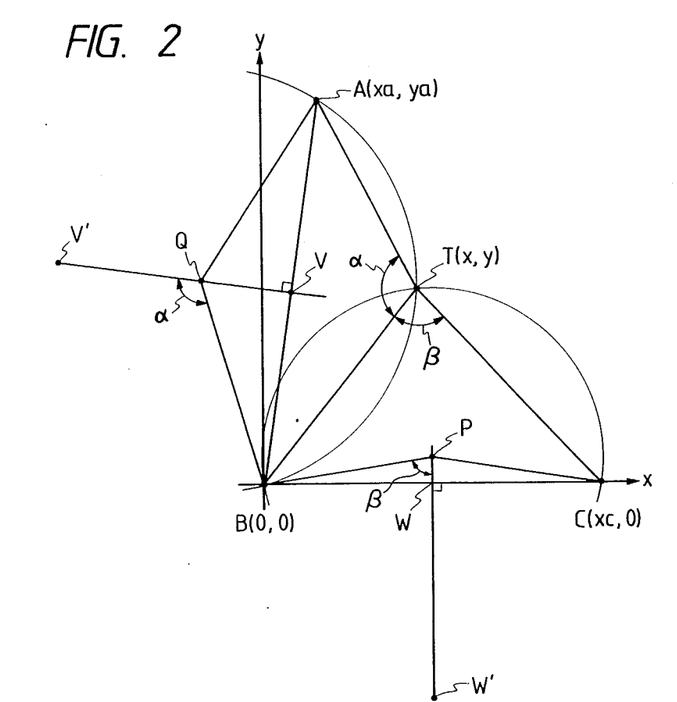
FIG. 2 is an explanatory diagram for explaining the principle of detecting a position of a moving vehicle.
Figure 3:
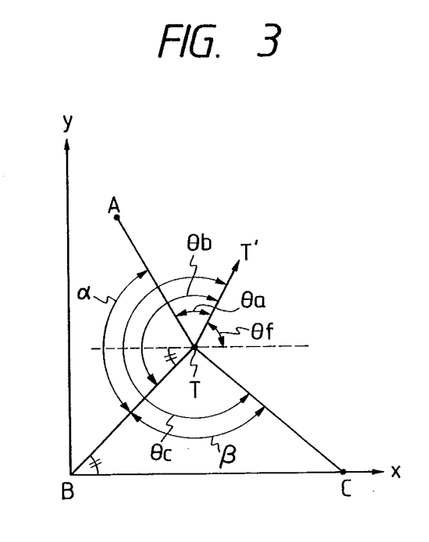
FIG. 3 is an explanatory diagram for explaining the principle of detecting an advance direction of a moving vehicle.

In accordance with the present embodiment having the above described construction, an essential principle for detecting a position and a forward direction of the moving vehicle 1 will be described hereinbelow. In FIGS. 2 and 3, positions of the moving vehicle 1 and the reflectors 6a-6c are shown, respectively, on the execution coordinate system obtained by subjecting a primitive coordinate system, wherein the moving vehicle 1 is defined as the origin, to coordinate transformation in accordance with the undermentioned procedure. In these Figures, the positions of the reflectors 6a-6c are represented by reference characters A, B and C, respectively. The moving vehicle 1 resides at point T, and the positions of reflectors 6a-6c located in a working area of the moving vehicle I are indicated by an x-y coordinate or execution coordinate system wherein the position B of the reflectors 6b is defined as the origin, and a line extending through the reflectors 6b and 6c is fixed as the x-axis.

As is apparent from FIG. 2, the position T of the moving vehicle is present on a circumscribed circle for a triangle ATB as well as a circumscribed circle for a triangle BTC. Accordingly, when two points of intersection of the circumscribed circles Q and P for the triangles ATB and BTC are calculated, the position of the moving vehicle 1 is fixed. In this case, since the reflector 6b is the origin, the other intersection T of the circumscribed circles P and Q is calculated in accordance with the following procedure so that a position of the moving vehicle 1 is found.

First, if the center of the circumscribed circle for the triangle BTC is represented by P, the center P resides on a perpendicular bisector of a segment of the line BC, and it gives the following equation, $$\angle BPW' = \beta$$

where W' is a point on the perpendicular bisector of the segment BC and which resides on the side opposite to the point T with respect to the straight line BC and is sufficiently apart from the straight line, from a relationship between the central angle and the angle of circumference $\beta$.

Observing a triangle BPW (W is midpoint of the segment BC), coordinates of the center P of the circle and a radius thereof are $\{xc/2, (xc/2) \cot \beta\}$ and $|xc/(2 \sin \beta)|$, respectively. Hence, the circumscribed circle having center P is represented by the following equation.

$$(x-xc/2)^2 + \{y-(xc/2) \cot \beta\}^2 = \{xc/(2 \sin \beta)\}^2$$

When the equation is rearranged, the following equation (1) is obtained.

$$x^2 - xc.x + y^2 - xc.y. \cot \beta = 0 \tag{1}$$

When the center of the circumscribed circle for the triangle ATB is fixed as Q, the center Q resides on a perpendicular bisector of a segment of the line AB, and it gives the following equation, $$\angle BQV' = \alpha$$

where V' is a point on the perpendicular bisector of the segment AB and which resides on the side opposite to the point T with respect to the straight line AB and is sufficiently apart from the straight line.

Observing a triangle BQV (V is midpoint of the segment AB), coordinates of the center Q of the circle and a radius thereof are $\{xa/2+(ya/2) \cot \alpha, ya/2-(xa/2) \cot \alpha\}$ and $|\sqrt{xa^2+ya^2}/(2 \sin \alpha)| \sqrt{xa^2+ya^2}$, respectively. Hence, the circumscribed circle having center Q is represented by the following equation (2)

$$x^2 - x(xa+ya. \cot \alpha) + y^2 - y(ya-xa. \cot \alpha) = 0 \tag{2}$$

From the above equations (1) and (2), coordinates (x, y) of the point T are calculated from the following equations (3) and (4).

$$x = xc(1+k. \cot \alpha)/(1+k^2) \tag{3}$$

$$y = kx \tag{4}$$

where k is represented by an equation (5):

$$k = (xc-xa-ya. \cot \alpha)/(ya-xa. \cot \alpha - xc. \cot \beta) \tag{5}$$

and which indicates an inclination of a straight line BT.

Furthermore, an advance direction of the moving vehicle 1 is calculated as follows. In FIG. 3, assuming that an angle defined by the advance direction TT' of the moving vehicle 1 and x-axis is $\theta f$, and angles of rotation defined by the respective reflectors 6a, 6b and 6c (points A, B and C, respectively) with respect to the advance direction as reference are $\theta a$, $\theta b$ and $\theta c$, since the inclination of the segment BT is k, it gives the following equation, $$\theta f = 180° - (\theta b - \tan^{-1} k) \tag{6}$$

Figure 4:
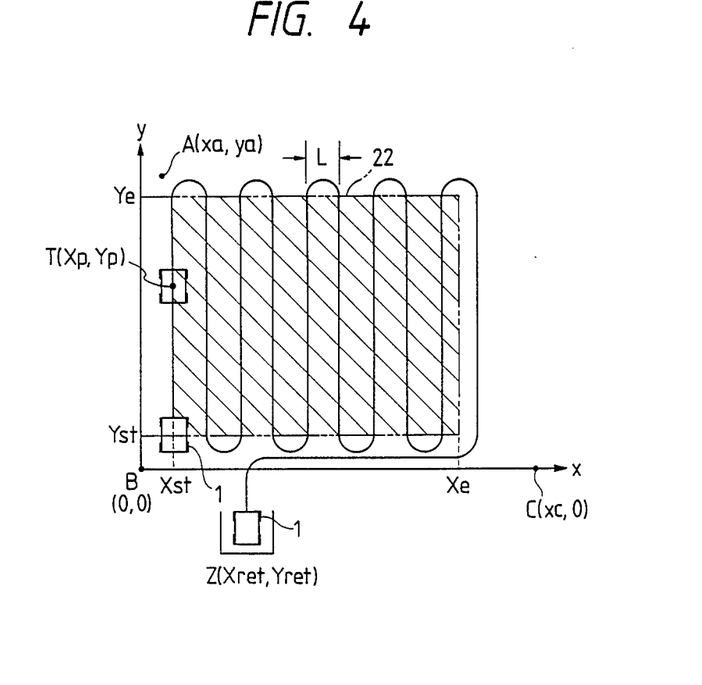
FIG. 4 is a schematic diagram showing an arrangement of reflectors in respect of a traveling course of a moving vehicle.
Figure 5:
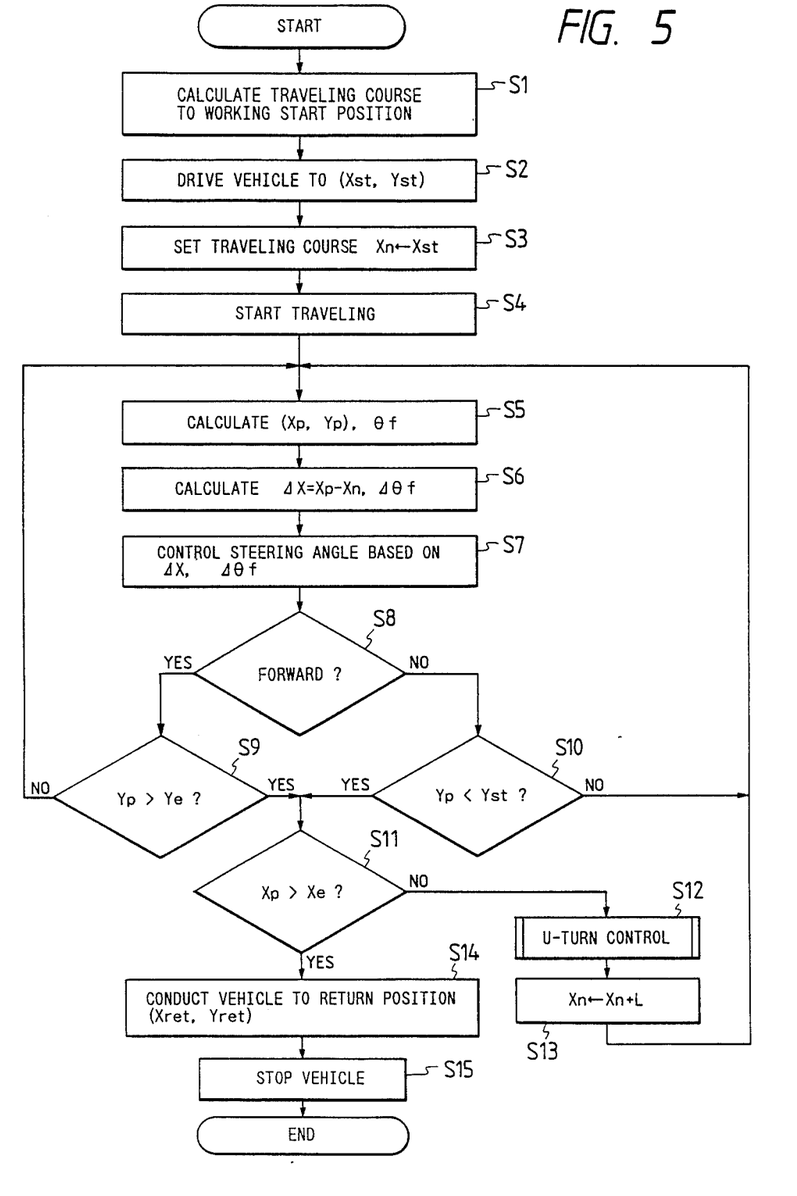
FIG. 5 is a flowchart showing steering control.

Next, steering control for the moving vehicle 1 based on positional information of the moving vehicle 1 calculated in accordance with the above procedure will be described hereinbelow. FIG. 4 is a schematic diagram showing a state of arrangement in respect of a traveling course of the moving vehicle 1 relative to reflectors 6, and FIG. 5 is a flowchart illustrating a procedure for steering control.

In FIG. 4, points A, B and C indicate positions at which the reflectors 6a-6c are disposed, and a position and a working area 22 of the moving vehicle 1 are represented by an execution coordinate system wherein the point B is fixed as the origin, and a straight line extending between the points B and C is defined as the x-axis. (Xret, Yret) indicate coordinates of a returning position Z of the moving vehicle 1, and the working area 22 is a quadrilateral region including four apexes of the points represented by four coordinates (Xst, Yst), (Xst, Ye), (Xe, Yst) and (Xe, Ye). In this case, the current position of the moving vehicle 1 is represented by T(Xp, Yp).

For simplicity, while an example wherein four sides of the working area 22 are parallel to x- or y-axes is shown in FIG. 4, another direction and/or shape of the working area may be selected so far as the points A-C are disposed around the working area 6.

In accordance with the flowchart shown in FIG. 5, a control procedure will be described hereinbelow in which it is assumed that the moving vehicle 1 reciprocates in directions parallel to the y-axis as in the traveling locus of FIG. 4, and the pitch therefor is L.

In step S1, a traveling course for the vehicle to a working start position on the basis of both coordinates of the current position (Xret, Yret) of the moving vehicle 1 obtained in the position-advance direction operating means 13 and of the working start position (Xst, Yst) is set in the traveling course setting means 16.

In step S2, the engine is started by the driving means 18. Then, the clutch is engaged to drive the moving vehicle 1 and it is positioned at the working start position (Xst, Yst).

In step S3, Xst is set as an X-coordinate of the traveling course Xn so that the traveling course is decided.

When starting the travel of the moving vehicle 1 in step S4, the moving vehicle 1 operates the present position (Xp, Yp) and an advance direction $\theta f$ thereof in step S5.

In step S6, a deviation amount of the traveling course ($\Delta X = Xp - Xn$, $\Delta \theta f$) is operated, and a steering angle is controlled by the steering means in response to the amount of deviation calculated in step S7.

In step S8, it is judged that either the moving vehicle 1 travels towards the direction going away from the origin (forward direction) or the direction approaching the origin (reverse direction) in the y-axial direction.

In the case of forward direction, it is judged whether one stroke is finished (Yp>Ye) or not in step S9, whilst in case of reverse direction, it is judged whether one stroke is finished (Yp<Yst) or not in step S10. When it is judged that such one stroke is not finished in either step S9 or step S10, processings in steps S5-S8 are repeated.

In the case where it is judged that such one stroke is finished in either step S9 or S10, it is judged in the following step S11 whether all the strokes are finished (Xp>Xe) or not.

When all strokes are not finished, the procedure shifts from step S11 to step S12 to effect U-turn control of the automated vehicle 1.

U-turn control is carried out in accordance with a different method from the one for steering control in a straight traveling course which is effected according to processing steps S5-S7 wherein the positional information of the moving vehicle 1 operated by the position-advance direction operating means 13 is fed back to the steering means 14.

More specifically, it is adapted that the vehicle 1 is traveled while fixing a steering angle thereof to a predetermined angle in a turning course, and the moving vehicle returns to steering control in a straight traveling course which is effected in accordance with processings of steps S5-S7 at the time when an azimuth of the respective reflectors 6 viewed from the vehicle 1, which is calculated based on the differential azimuthes detected in the angle detection means 10, coincides substantially with a predetermined azimuth. The details of U-turn control for traveling the moving vehicle along the turning course will be described later.

In step S13, a pitch L is added to Xn thereby operating (Xn+L) and as a result, the following traveling course is. When set the following traveling course is set, the procedure returns to step S5 and the above described processings are repeated.

When all strokes are completed, the moving vehicle returns to the return position (Xret, Yret) in step S14, and the travel thereof stops in step S15.

Figure 7:
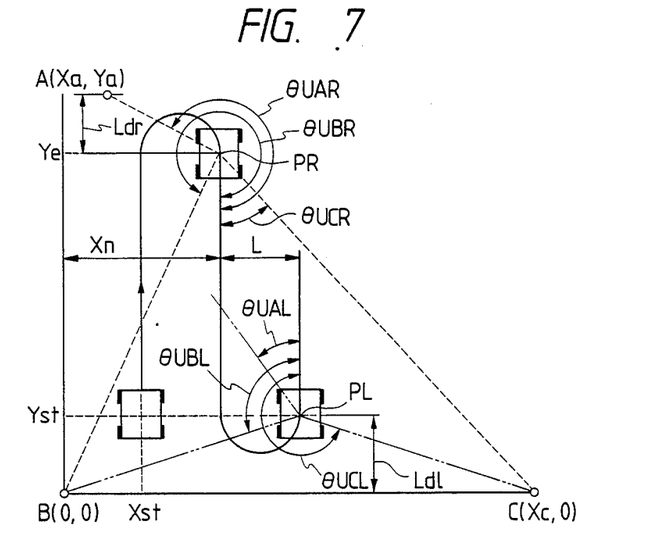
FIGS. 7 and 8 are diagrams each showing a moving vehicle and reflectors in a turning course and a straight traveling course.

Next, the aforesaid U-turn control will be described hereinbelow. FIG. 7 is a diagram showing a positional relationship between the moving vehicle 1 and the reflectors 6a-6c for explaining a condition for releasing the fixation of a steering angle. Calculating expressions for setting values to be compared with azimuthes of the respective reflectors 6a-6c will be shown in the following Table 1 attached to the last paragraph of the specification. In FIG. 7, the same reference characters designate the same or corresponding parts throughout FIG. 4.

A U-turn starts at the time when the moving vehicle 1 has completed the traveling in a straight course,, i.e., in the case where the Y-coordinate (Yp) of the current position of the moving vehicle 1 is expressed by (Yp>Ye) or (Yp<Yst). The U-turn is effected with a fixed U-turn steering angle which is set for fixing a steering angle of the front wheels 17 to a predetermined angle. The fixing state of the steering angle is released in the case where the condition which will be explained hereinbelow is satisfied.

Ldr represents a distance between a predetermined position PR where the moving vehicle 1 starts traveling along a reverse direction after the vehicle has completed a U-turn at the terminal of a forward way and a point A in Y-axial direction, and Ldl represent the Y-coordinate of a predetermined position PL where the moving vehicle 1 starts traveling along a forward direction after the vehicle has completed a U-turn at the terminal of a reverse way.

$\theta$UAR, $\theta$UBR and $\theta$UCR represent angles defined between lines connecting a predetermined position PR where the moving vehicle 1 starts traveling along a reverse direction after the vehicle has completed a right U-turn at the terminal of a particular forward way to points A, B and C, respectively, and an advance direction of a predetermined reverse way of the moving vehicle 1. $\theta$UAL, $\theta$UBL and $\theta$UCL represent angles defined between lines connecting a predetermined position PL where the moving vehicle 1 starts traveling along a forward direction after the vehicle has completed a left U-turn at the terminal of a particular reverse way to the points A, B and C, respectively, and an advance direction of a predetermined forward way of the moving vehicle 1.

The angles $\theta$UAR, $\theta$UBR, $\theta$UCR, $\theta$UAL, $\theta$UBL and $\theta$UCL are obtained in accordance with the expressions shown in Table 1, and the resulting angle values are set in the predetermined angle setting means 23 as the set values. In the calculating expressions, both the Ldr and Ldl are indicated by Ld.

Figure 9:
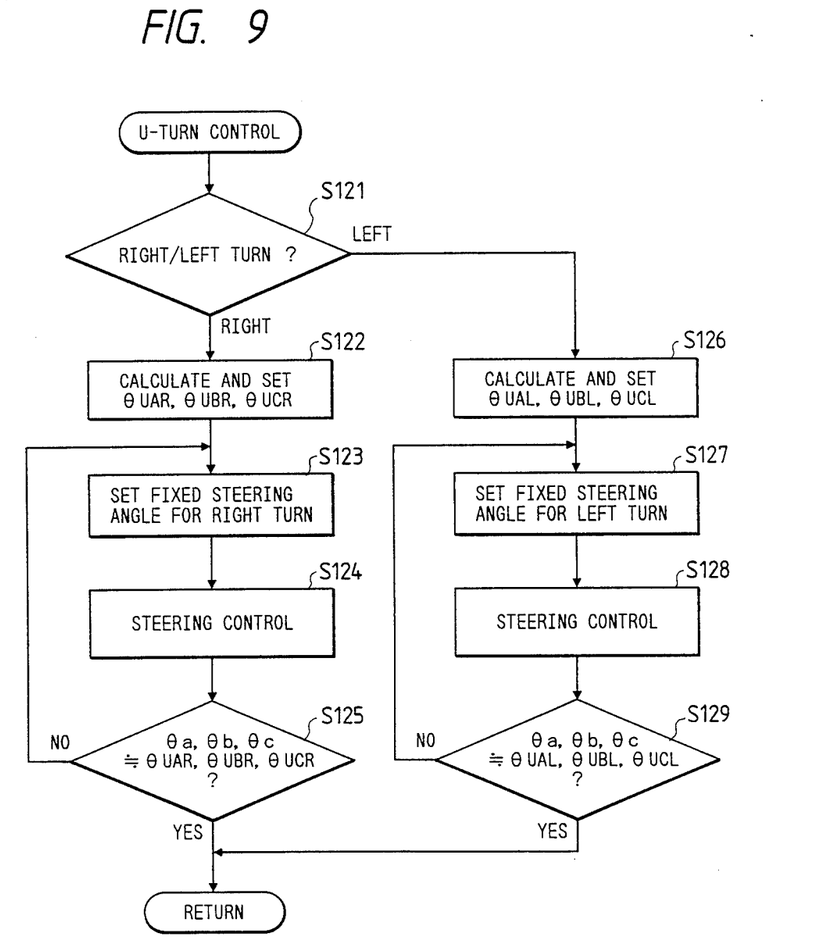
FIG. 9 is a flowchart illustrating a U-turn control.

FIG. 9 illustrates an example of a flowchart for U-turn control wherein it is judged in step S121 whether the moving vehicle 1 is going to turn right or left. This judgment is carried out by determining whether the condition is (Yp>Ye) or (Yp<Yst).

In the case of right turning, the operation proceeds to step S122 and $\theta$UAR, $\theta$UBR and $\theta$UCR are calculated as set values for a condition of completing the turn, and thereafter the calculated values are set in the predetermined angle setting means 23.

In step S123, a fixed value of steering angle for a U-turn is set in the steering means 14, and in step S124, steering for the front wheels 17 is carried out by means of the motor 35 on the basis of the steering angle set.

In step S125, it is judged whether or not a turn is completed by releasing a fixed state of a steering angle. This judgment is done in such a manner that in the case where a current position of the moving vehicle 1 is at T (FIG. 3), an angle $\theta$a defined by forward direction TT' of the moving vehicle 1 and a line segment TA, an angle $\theta$b defined by the line TT' and a line segment TB, and an angle $\theta$c defined by the line TT' and a line segment TC are successively compared with $\theta$UAR corresponding to the angle $\theta$a, $\theta$UBR corresponding to the angle $\theta$b, and $\theta$UCR corresponding to the angle $\theta$c, respectively.

As a result, it is judged whether or not the former angles are substantially equal to the latter data so that when any one of the results is equal, it concludes, "YES". If the judgment is "YES", fixation of a steering angle is released, and the operation proceeds to step S13 in FIG. 5 and the moving vehicle shifts to traveling along a straight course.

In the case where the judgment in step 125 is "NO", the processings in steps S123 and S124 are repeated, so that steering control on the basis of a fixed steering angle is effected.

In the case of left turning, the operation proceeds to step S126, and the $\theta$UAL, $\theta$UBL and $\theta$UCL are calculated so that the resulting values are set in the predetermined angle setting means 23.

Since the following steps S127-S129 are the same with those of S123-S125, the explanation therefor will be omitted.

The present invention is not limited to a working area as described in the above embodiment wherein the straight traveling courses are in parallel to one another, and the turning courses are U-turn courses succeeding to the terminals of the parallel straight routes, but it is apparent that the present invention can be also applied to such working area wherein the turning course succeeding to a straight traveling course is a right-angled turning course in which the straight traveling course is changed at a right angle. In that case, calculating expressions for values to be set in the predetermined angle setting means 23 have been prepared as follows.

Figure 8:
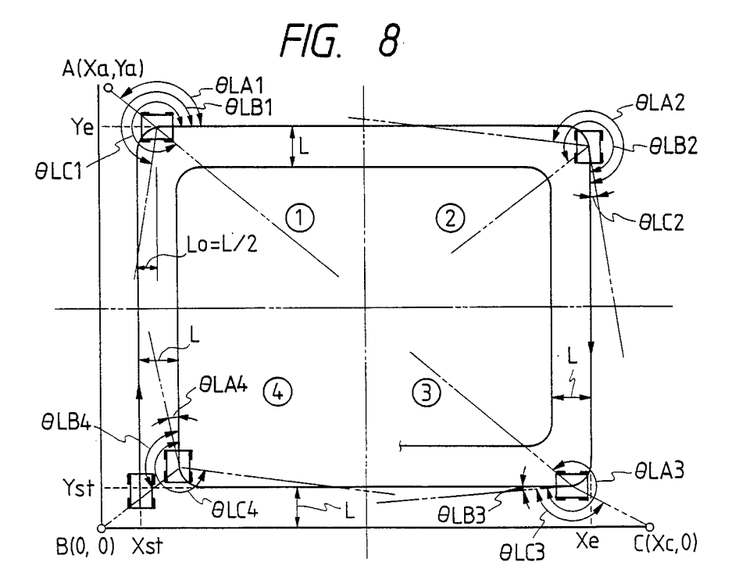

FIG. 8 is a diagram showing a positional relationship between the moving vehicle 1 and the reflectors 6 in the case where the turning course is a right-angled turning course in which a straight traveling course is changed at a right angle.

Calculating expressions for set values to be compared to azimuthes based on differential azimuthes between the respective reflectors 6 obtained in the angle detection means 10 will be indicated in the following Table 2 succeeding to the last paragraph of the specification.

In FIG. 8, the same reference characters designate the same or corresponding parts throughout FIG. 7.

In FIG. 8, the moving vehicle 1 starts such travel for working in the Y-axial direction from a point having coordinate values (Xst, Yst), effects a first right-angled turning in an area ① point (Xst, Ye−Lo) to point (Xst+Lo, Ye) as its target, carries out a second right-angled turning in an area ② from point (Xe−Lo, Ye) to point (Xe, Ye−Lo) as its target, effects a third right-angled turning in an area ③ point (Xe, Yst+Lo) to point (Xe−Lo, Yst) as its target, and carries out a fourth right-angled turning in an area ④ from point (Xst+Lo+L Yst) to point (Xst+L, Yst+Lo) as its target. From then onward, a predetermined working is continued while changing inwardly the straight traveling course by a distance L at every turn.

$\theta$LA1−$\theta$LA4 represent the differential azimuth defined between an advance direction of the moving vehicle 1 and point A at a predetermined position for completing a right-angled turning in the respective areas ①-④, $\theta$LB1-$\theta$LB4 represent the differential azimuth defined between an advance direction of the moving vehicle 1 and point B at the predetermined position for completing the right-angled turning in the respective areas ①-④, and $\theta$LC1-$\theta$LC4 represent the differential azimuth defined between an advance direction of the moving vehicle 1 and point C at the predetermined position for completing the right-angled turning in the respective areas ①-④, respectively.

Predetermined differential azimuthes of the points A-C in respect to the advance direction of the vehicle at each predetermined position for completing the right-angled turning in the above described respective areas are obtained in accordance with calculating expressions shown in Table 2 succeeding to the last paragraph of the present specification, and the results obtained are set in the predetermined angle setting means 23.

Values of the predetermined azimuthes set in the predetermined angle setting means 23 are used for control of releasing a turn in case of a right-angled turning in the same manner as in the case of the above described U-turn control.

In Table 2, a value of "I" is "0" at the time when the vehicle 1 starts the traveling from coordinate (Xst, Yst), and the value "I" is renewed by adding "1" each in every occasion of completing a turn in the traveling area ③. While the coordinate (Xst, Yst) of the working start position relating to the coordinate origin B (0, 0) is previouly set in the traveling course setting means 16 in the above mentioned embodiment of the present invention, it may be possible to drive the vehicle 1 by means of remote control or radio guidance to a desired position which is defined thereafter as the working start position (Xst, Yst), and then to cause the vehicle begin working.

While an angle to be set in the predetermined angle setting means 23 bas been calculated in every turn and the resulting calculated value has been set thereto in the present embodiment, a predetermined angle in each turning course may have been previously set.

As described above, in the present embodiment, the differential azimuthes between two adjoining reflectors 6 centering around the moving vehicle 1 is detected by the use of the light beam, and steering control in a straight traveling course of the moving vehicle 1 is effected on the basis of the results detected.

In a turning course succeeding to the straight traveling course, the moving vehicle 1 is traveled in a state where a steering angle of the front wheels 17 is fixed, its turn is completed at the time when one of azimuthes of the respective reflectors 6a-6c reaches a predetermined angle, and the travel of the moving vehicle shifts again to that along a straight traveling course in the above mentioned embodiment of the present invention.

In other words, in a turning course, a detection signal of the differential azimuth is not directly used for steering control for wheels of the moving vehicle 1, but utilized to determine whether or not the moving vehicle has reached a predetermined position at which the turning course finishes.

Furthermore, such a detection signal indicating that an azimuth of the respective reflectors 6a–6c exceeds a predetermined angle may also be used as a signal for releasing fixation of a steering angle and shifting to the travel along a straight traveling course.

As a result, since turning control is realized by only fixing the steering angle at a predetermined angle, a construction of the system can be made simple, and a fixed state of the steering angle is release accurately at a predetermined position on the basis of a received light signal responding to the light beam reflected from the reflectors 6.

As is apparent from the above description, the following advantages can be attained in accordance with the present invention.

(1) Since a steering angle for the wheels of a moving vehicle is controlled on the basis of a fixed steering set value, there are less unstable factors in control due to errors in coordinate calculation during turning of the vehicle, so that a stable turning locus with less dispersion is drawn, and finish of working such as lawn mowing work and the like becomes more accurate.

(2) Even in a turning course, a position of completing the turning course can be simply detected on the basis of azimuthes of the respective reference points (positions at which reflectors are set) by means of the output of a beam receiver means which is obtained while maintaining the same operations in a beam source means and the beam receiver means as that in a straight traveling course, and it is possible to shift the moving vehicle to the travel in a straight traveling course without any change of the above described detecting operation.

(3) Since a signal obtained from the same and single beam receiver means is separated into two modes for use in traveling on a straight traveling course and traveling on a turning course, construction of the system becomes simple.

TABLE 1

| SET VALUE | | CALCULATING EXPRESSION |
|---|---|---|
| RIGHT TURN | $\theta$UAR | $180° + \tan^{-1}\left(\dfrac{Xn - Xa}{Ld}\right)$ |
| | $\theta$UBR | $360° - \tan^{-1}\left(\dfrac{Xn}{Ya - Ld}\right)$ |
| | $\theta$UCR | $\tan^{-1}\left(\dfrac{Xc - Xn}{Ya - Ld}\right)$ |
| LEFT TURN | $\theta$UAL | $\tan^{-1}\left(\dfrac{Xn + L - Xa}{Ya - Ld}\right)$ |
| | $\theta$UBL | $180° - \tan^{-1}\left(\dfrac{Xn + L}{Ld}\right)$ |

TABLE 1-continued

| SET VALUE | CALCULATING EXPRESSION |
|---|---|
| $\theta$UCL | $180° + \tan^{-1}\left(\dfrac{Xc - (Xn\ L)}{Ld}\right)$ |

TABLE 2

| SET VALUE | | CALCULATING EXPRESSION |
|---|---|---|
| ① | $\theta$LA1 | $180° - \tan^{-1}\left(\dfrac{Ya - Ye - I \cdot L}{Xst + I \cdot L + L0 - Xa}\right)$ |
| | $\theta$LB1 | $180° + \tan^{-1}\left(\dfrac{Ye - I \cdot L}{Xst + I \cdot L + L0}\right)$ |
| | $\theta$LC1 | $360° - \tan^{-1}\left(\dfrac{Ye - I \cdot L}{Xc - Xst - I \cdot L - L0}\right)$ |
| ② | $\theta$LA2 | $180° + \tan^{-1}\left(\dfrac{Xe - Xa - I \cdot L}{Ya - Ye + I \cdot L + L0}\right)$ |
| | $\theta$LB2 | $360° - \tan^{-1}\left(\dfrac{Xe - I \cdot L}{Ye - I \cdot L - L0}\right)$ |
| | $\theta$LC2 | $\tan^{-1}\left(\dfrac{Xc - Xe + I \cdot L}{Ye - I \cdot L - L0}\right)$ |
| ③ | $\theta$LA3 | $360° - \tan^{-1}\left(\dfrac{Ya - Yst - I \cdot L}{Xe - I \cdot L - L0 - Xa}\right)$ |
| | $\theta$LB3 | $\tan^{-1}\left(\dfrac{Yst + I \cdot L}{Xe - I \cdot L - L0}\right)$ |
| | $\theta$LC3 | $180° - \tan^{-1}\left(\dfrac{Yst + I \cdot L}{Xc - Xe + I \cdot L + L0}\right)$ |
| ④ | $\theta$LA4 | $\tan^{-1}\left(\dfrac{Xst + I \cdot L - Xa}{Ya - Yst - I \cdot L - L0}\right)$ |
| | $\theta$LB4 | $180° - \tan^{-1}\left(\dfrac{Xst + I \cdot L}{Yst + (I - 1) \cdot L + L0}\right)$ |
| | $\theta$LC4 | $180° + \tan^{-1}\left(\dfrac{Xc - Xst - I \cdot L}{Yst + (I - 1) \cdot L + L0}\right)$ |

What is claimed is:

1. A steering control system for use in a moving vehicle wherein a light beam emitted from the moving vehicle is scanned in all the different azimuthal directions around the moving vehicle, and the light reflected by reflecting means disposed at at least three positions apart from and around the moving vehicle, respectively, is received in order by a beam receiver means mounted on the moving vehicle and rotating in a horizontal plane, whereby positional information of the moving vehicle is detected on the basis of the output of the beam receiver means so that the moving vehicle is traveled On the basis of the positional information along a straight traveling course and the succeeding turning course, comprising means for detecting differential azimuthes between two adjoining light-reflecting means centering around the moving vehicle:

means for controlling steering of the moving vehicle in a straight traveling course based on the differential azimuthes;

means for fixing the steering angle of the moving vehicle at a predetermined angle at the time when the moving vehicle positions at a switching point where a straight traveling course is to be changed into a turning course;

detection means for detecting a substantial coincidence of any one of azimuthes of the respective light-reflecting means viewed from the moving vehicle with a predetermined angle which has been set so as to be compared with the azimuth; and means for releasing the fixation of the steering angle in response to a detection signal of the detection means.

2. A steering control system for use in a moving vehicle wherein a light beam emitted from the moving vehicle is scanned in all the different azimuthal directions around the moving vehicle, and the light reflected by reflecting means disposed at at least three positions apart from and around the moving vehicle, respectively, is received in order by a beam receiver means mounted on the moving vehicle and rotating in a horizontal plane, whereby positional information of the moving vehicle is detected on the basis of the output of the beam receiver means so that the moving vehicle is traveled on the basis of the positional information along a straight traveling course and the succeeding turning course, comprising means for detecting differential azimuthes between two adjoining light-reflecting means centering around the moving vehicle;

means for controlling steering of the moving vehicle in a straight traveling course based on the differential azimuthes;

means for fixing the steering angle of the moving vehicle at a predetermined angle at the time when the moving vehicle positions at a switching point where a straight traveling course is to be changed into a turning course;

detection means for detecting a fact that any one of azimuthes of the respective light-reflecting means viewed from the moving vehicle exceeds a predetermined angle which has been set so as to be compared with the azimuth; and means for releasing the fixation of the steering angle in response to a detection signal of the detection means.

3. A steering control system for use in a moving vehicle as claimed in claim 1, wherein the predetermined angle which has been set so as to be compared with the azimuth is an azimuth of the respective light-reflecting means around the moving vehicle at a predetermined turning point at which a traveling course of the moving vehicle changes from a turning course to a straight traveling course and a value of the predetermined angle is obtained by calculating geometrically in accordance with a predetermined calculating expression.

4. A steering control system for use in a moving vehicle as claimed in claim 2, wherein the predetermined angle which has been set so as to be compared with the azimuth is an azimuth of the respective light-reflecting means around the moving vehicle at a predetermined turning point at which a traveling course of the moving vehicle changes from a turning course to a straight traveling course and a value of the predetermined angle is obtained by calculating geometrically in accordance with a predetermined calculating expression.

5. A steering control system for use in a moving vehicle as claimed in claim 1, wherein the value of the predetermined angle is calculated to set whenever the moving vehicle completes travel of a straight traveling course.

6. A steering control system for use in a moving vehicle as claimed in claim 2, wherein the value of the predetermined angle is calculated to set whenever the moving vehicle completes travel of a straight traveling course.

7. A steering control system for use in a moving vehicle as claimed in claim 3, wherein the value of the predetermined angle is calculated to set whenever the moving vehicle completes travel of a straight traveling course.

8. A steering control system for use in a moving vehicle as claimed in claim 1, wherein the value of the predetermined angle in the respective turning courses has been calculated to set prior to actual traveling of the vehicle.

9. A steering control system for use in a moving vehicle as claimed in claim 2, wherein the value of the predetermined angle in the respective turning courses has been calculated to set prior to actual traveling of the vehicle.

10. A steering control system for use in a moving vehicle as claimed in claim 3, wherein the value of the predetermined angle in the respective turning courses has been calculated to set prior to actual traveling of the vehicle.

* * * * *